(12) United States Patent
Jung

(10) Patent No.: US 12,172,364 B2
(45) Date of Patent: Dec. 24, 2024

(54) METHOD AND SYSTEM FOR MANUFACTURING HYBRID COMPONENT

(71) Applicants: HYUNDAI MOTOR COMPANY, Seoul (KR); KIA CORPORATION, Seoul (KR)

(72) Inventor: Youn-Il Jung, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/404,024

(22) Filed: Jan. 4, 2024

(65) Prior Publication Data
US 2024/0131778 A1 Apr. 25, 2024
US 2024/0227280 A9 Jul. 11, 2024

Related U.S. Application Data

(62) Division of application No. 17/470,126, filed on Sep. 9, 2021, now Pat. No. 11,897,185.

(30) Foreign Application Priority Data

Jul. 16, 2021 (KR) ........................ 10-2021-0093551

(51) Int. Cl.
*B29C 63/48* (2006.01)
*B21D 13/04* (2006.01)
(Continued)

(52) U.S. Cl.
CPC ............ *B29C 63/486* (2013.01); *B21D 13/04* (2013.01); *B21D 22/022* (2013.01);
(Continued)

(58) Field of Classification Search
None
See application file for complete search history.

(56) References Cited

U.S. PATENT DOCUMENTS 4,947,539 A * 8/1990 Aussieker ............ H02K 15/028
310/90
2003/0122400 A1* 7/2003 Berglund .................. B60J 10/79
296/146.9
(Continued)

FOREIGN PATENT DOCUMENTS

EP 3291287 A1 3/2018
KR 2002-0095816 A 12/2002
(Continued)

*Primary Examiner* — Michael N Orlando
*Assistant Examiner* — Abhishek A Patwardhan
(74) *Attorney, Agent, or Firm* — MCDONNELL BOEHNEN HULBERT & BERGHOFF LLP

(57) ABSTRACT

The present disclosure relates to a system for manufacturing a hybrid component including a first thermal supplier configured to heat a steel plate, a rolling roll for undercut configured to pressurize the steel plate heated by the first thermal supplier, and to form an undercut on one surface of the steel plate, a first molding roll configured to pressurize the steel plate formed with the undercut to mold the steel plate in a shape of a component to be manufactured, a composite material feeder configured to supply a composite material tape to be seated on one surface of the steel plate formed with the undercut through the first molding roll, and a composite material pressurization roll configured to pressurize the steel plate on which the composite material tape is seated.

13 Claims, 13 Drawing Sheets

(51) Int. Cl.
  *B21D 22/02* (2006.01)
  *B21D 35/00* (2006.01)
  *B21D 37/16* (2006.01)
  *B29C 63/00* (2006.01)
  *B29K 77/00* (2006.01)
  *B29K 105/08* (2006.01)
  *B29K 307/04* (2006.01)
  *B29K 705/00* (2006.01)
  *B29L 31/30* (2006.01)

(52) U.S. Cl.
  CPC ........... *B21D 35/002* (2013.01); *B21D 37/16* (2013.01); *B29C 63/0021* (2013.01); *B29C 2063/006* (2013.01); *B29K 2077/00* (2013.01); *B29K 2105/08* (2013.01); *B29K 2307/04* (2013.01); *B29K 2705/00* (2013.01); *B29L 2031/3002* (2013.01)

(56) References Cited

U.S. PATENT DOCUMENTS

| | | | |
|---|---|---|---|
| 2008/0157607 A1* | 7/2008 | Scheich | F16C 29/001 310/12.25 |
| 2010/0129684 A1* | 5/2010 | Nakagawa | B23K 26/211 219/148 |
| 2014/0120365 A1* | 5/2014 | Miyoshi | C22C 38/60 428/626 |
| 2017/0305115 A1 | 10/2017 | Sieg | |
| 2020/0180293 A1 | 6/2020 | Wikstrom | |
| 2022/0103036 A1* | 3/2022 | Ihara | H02K 1/2793 |

FOREIGN PATENT DOCUMENTS

| KR | 2006-0017126 A | 2/2006 |
|---|---|---|
| KR | 2018-0070519 A | 6/2018 |

\* cited by examiner

METHOD AND SYSTEM FOR MANUFACTURING HYBRID COMPONENT

CROSS REFERENCE TO RELATED APPLICATIONS

The present application is a divisional of U.S. patent application Ser. No. 17/470,126, filed Sep. 9, 2021, which claims priority to Korean Patent Application No. 10-2021-0093551, filed on Jul. 16, 2021. The entire disclosure contents of these applications are herewith incorporated by reference into the present application.

BACKGROUND

Field of the Disclosure

The present disclosure relates to a method and a system for manufacturing a hybrid component in which a steel plate and a composite material are bonded.

Description of Related Art

There continuously increases a need for reducing the weight of a vehicle body component in an automobile industry in order to improve fuel efficiency of an internal combustion engine vehicle depending upon the reinforcement of the CO 2 regulation, and to improve ranges of electric and hydrogen vehicles.

Conventionally, a steel-based vehicle body has responded to such a need by reducing the thickness by applying an ultra-high-tensile steel plate with improved strength compared to the conventional vehicle body to reduce the weight thereof, but there is a limit to reducing the weight of the vehicle body by applying the ultra-high-tensile steel plate in order to secure performance such as the rigidity of the vehicle body.

Therefore, a ratio of applying the lightweight metal, such as aluminum, increases, and furthermore, the application of a composite material, such as CFRP lighter than a metal, is also being reviewed. However, the composite material has a high specific strength and is advantageous for reducing the weight of the vehicle body, but is expensive and difficult to be bonded to the metal, and therefore, to solve a problem where the composite material may not be expansively applied, technologies are being developed for a method for locally patching the composite material to a portion where performance reinforcement is required.

The method for applying the patch, as a method for bonding the composite material to the surface of the component made of the steel plate in the patch form through 'a thermal pressurization method', is a method for integrating, with the adhesive film, and curing a composite prepreg, which is pre-cut to fit the portion that requires the reinforcement of the components made of the steel plate and has a limit to being expansively applied to various components due to the problem of requiring 12 or more processes and therefore, having very low productivity.

The contents described in Description of Related Art are to help the understanding of the background of the present disclosure, and may include what is not previously known to those skilled in the art to which the present disclosure pertains.

SUMMARY

The present disclosure has been made in an effort to solve the above problem associated with the related art, and an object of the present disclosure is to provide a method and a system for manufacturing a hybrid component, which may improve a process for manufacturing a patch-type hybrid component to simplify continuous manufacturing and operation processes, thereby improving productivity.

According to one aspect of the present disclosure, a system for manufacturing a hybrid component includes a first thermal supplier configured to heat a steel plate, a rolling roll for undercut configured to pressurize the steel plate heated by the first thermal supplier, and to form an undercut on one surface of the steel plate, a first molding roll configured to pressurize the steel plate formed with the undercut to mold the steel plate in a shape of a component to be manufactured, a composite material feeder configured to supply a composite material tape to be seated on one surface of the steel plate formed with the undercut through the first molding roll, and a composite material pressurization roll configured to pressurize the steel plate on which the composite material tape is seated.

Here, the first thermal supplier heats the steel plate at 900° C. or more.

Further, the first thermal supplier uses a xenon beam.

Further, the steel plate is coated with an Al—Si plating material.

Further, the system for manufacturing the hybrid component may further include a cartridge controller configured to control a temperature of a cartridge such that a temperature of the steel plate is maintained at 900° C. or more, in which the cartridge is disposed inside the rolling roll for undercut.

Further, the system for manufacturing the hybrid component may further include a refrigerant gas circulator configured to supply refrigerant, in which the refrigerant is circulated inside the first molding roll.

Further, the steel plate is cooled to 200° C. or less within 10 seconds after passing through the first molding roll.

Furthermore, the system for manufacturing the hybrid component may further include a second thermal supplier configured to simultaneously heat the composite material tape supplied by the composite material feeder and the facing surface of the steel plate.

Here, the second thermal supplier heats the steel plate and the composite material tape at 120° C. or more using a xenon beam.

More specifically, the rolling roll for undercut has a plurality of projections formed on an outer surface thereof.

Further, any lines connecting bottom surfaces and edge ends of the plurality of projections are tilted with respect to a radial direction of the rolling roll for undercut.

Further, the plurality of projections formed along the circumference of any circular cross section of the rolling roll for undercut are arranged in a plurality of pairs by forming two projections in pair.

Furthermore, any lines connecting the respective bottom surfaces and edge ends of the pair of projections are not parallel to each other.

Next, according to one aspect of the present disclosure, a method for manufacturing a hybrid component includes a first heating step that heats a steel plate by a first thermal supplier, forming an undercut on one surface of the steel plate heated by a rolling roll for undercut, a first roll forming step that pressurizes the steel plate formed with the undercut by a first molding roll to mold the steel plate in a shape of a component to be manufactured, and bonding a composite material tape to one surface of the steel plate, which is formed with the undercut passing through the first molding roll.

Further, the first heating step heats the steel plate at 900° C. or more.

Further, by the first roll forming step, the steel plate passes through the first molding roll by refrigerant that circulates inside the first molding roll and then is cooled to 200° C. or less within 10 seconds.

More specifically, the bonding of the composite material tape includes supplying the composite material tape such that the composite material tape is seated on one surface formed with the undercut, simultaneously heating the composite material tape supplied by the supplying of the composite material tape and the facing surface of the steel plate, and pressurizing the steel plate on which the composite material tape is seated by a composite material pressurization roll.

Further, the simultaneously heating of the composite material tape and the facing surface of the steel plate heats the steel plate and the composite material tape at 120° C. or more.

Further, the rolling roll for undercut in the forming of the undercut has a plurality of projections formed on an outer surface thereof.

Meanwhile, the method for manufacturing the hybrid component may further include a second roll forming step that additionally molds the steel plate by a plurality of second molding rolls having a diameter smaller than that of the first molding roll after the first roll forming step and cutting the steel plate to which the composite material tape is bonded after the bonding of the composite material tape.

The method and system for manufacturing the hybrid component according to the present disclosure may improve the process for manufacturing the patch-type hybrid component to simplify the continuous manufacturing and operation processes, thereby improving the productivity.

Further, it is possible to provide the certain pattern to the surface of the steel plate to increase the bonded surface area, and to improve the mechanical interlocking through the shape, thereby improving the coupling force between the steel plate and the composite material even within the short bonding time.

BRIEF DESCRIPTION OF THE FIGURES

FIGS. 13 and 14 illustrate the result of evaluating a bonding force between a steel plate and a composite material according to a structure of a surface of the steel plate, in which FIG. 13 illustrates a case where the structuring is not performed, and FIG. 14 illustrates a state of a case where the structuring according to the present disclosure is performed.

DETAILED DESCRIPTION

To fully understand the present disclosure, the operational advantages of the present disclosure, and the object achieved by the practice of the present disclosure, reference should be made to the accompanying drawings illustrating preferred exemplary embodiments of the present disclosure and the contents described in the accompanying drawings.

In describing preferred exemplary embodiments of the present disclosure, a description of well-known techniques or repetitive descriptions that may unnecessarily obscure the gist of the present disclosure will be reduced or omitted.

A 'thermal pressurization method', which is a method currently, widely used among methods for locally patching a composite material to a portion where performance reinforcement is required for a component made of a steel plate, has a disadvantage in that productivity is very low and therefore, a price of a component increases a lot. The present disclosure proposes a technology of manufacturing a steel plate-composite material patched hybrid component capable of significantly increasing productivity compared to the conventional method using a composite material tape so as to secure fast productivity for a composite material sole component unlike the conventional patch method.

To this end, a method for manufacturing a component by supplying the composite material tape from a roller and heating the composite material using a heat source, such as a laser, and coupling the composite material like textile may be considered, but such a method is difficult to simply apply to manufacturing a component having a form of patching the composite material to the surface of the steel plate component due to the following reasons.

Figure 1:
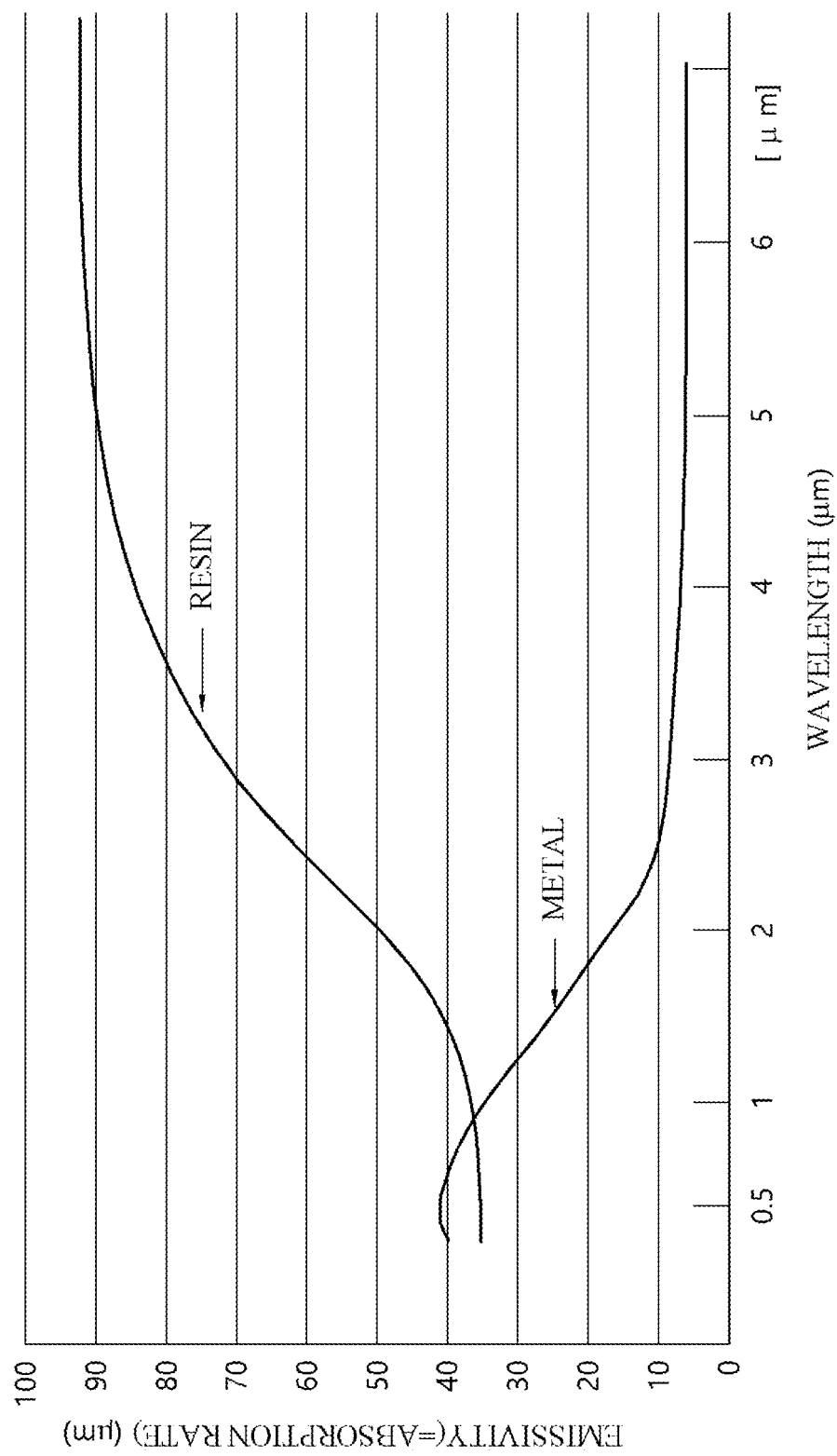
FIG. 1 illustrates a laser absorption rate by material and wavelength.

First, as illustrated in FIG. 1, it is impossible to simultaneously heat a composite material and a metal (steel) component because they have different wavelength regions in which a laser absorption rate by material is the highest. In other words, if only the composite material is heated, the molten composite material is rapidly cooled and is not bonded as soon as the composite material contacts a surface of the metal at a low temperature.

Further, the surface of the metal (steel) component has a low roughness and therefore, a coupling force upon patching the composite material is very low.

Therefore, the present disclosure intends to simplify an operation process to maximize productivity by developing a system and a method capable of simultaneously heating the steel plate and the composite material, and improving and continuously implementing the coupling force upon patching the composite material.

Figure 2:
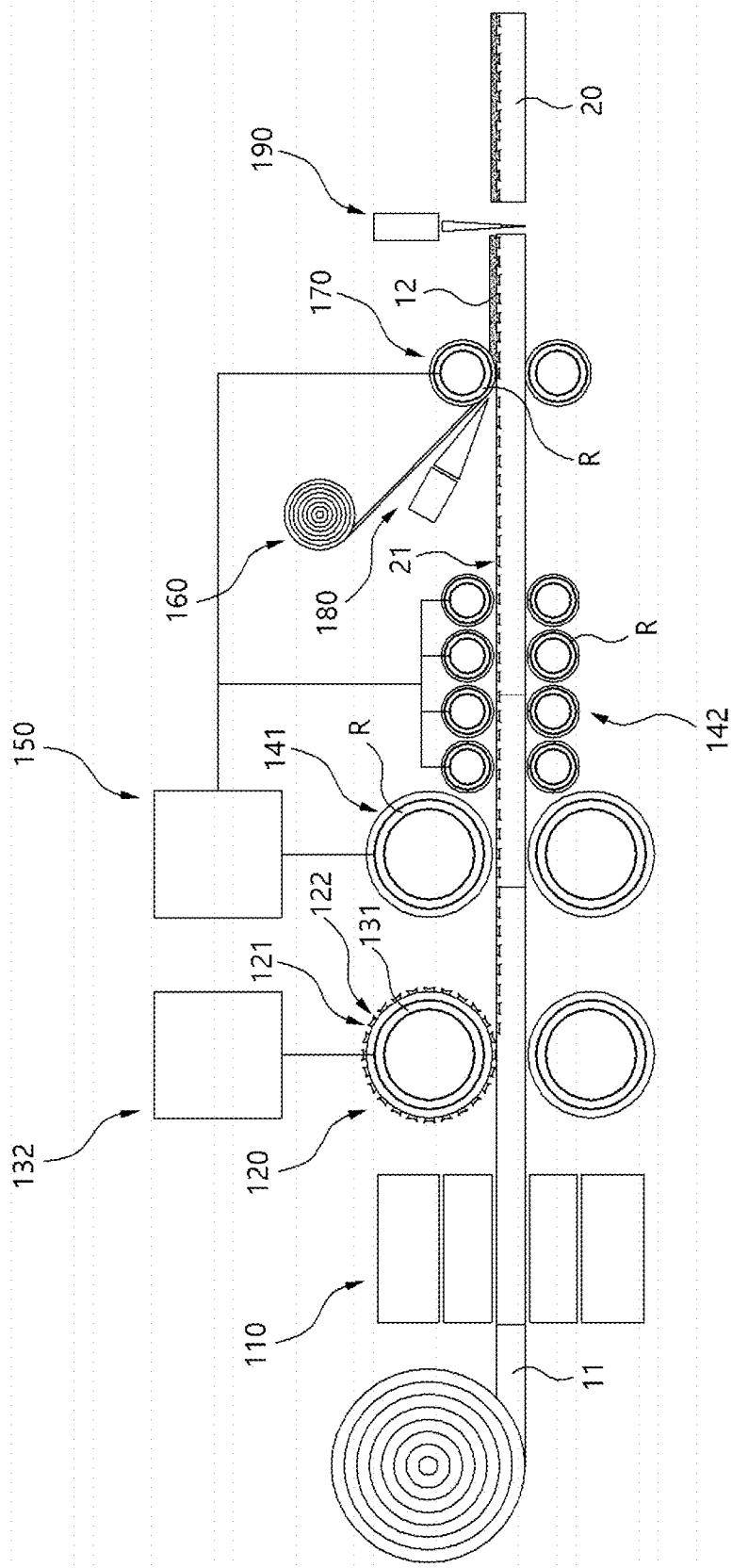
FIG. 2 illustrates a system for manufacturing a hybrid component according to the present disclosure.
Figure 3:
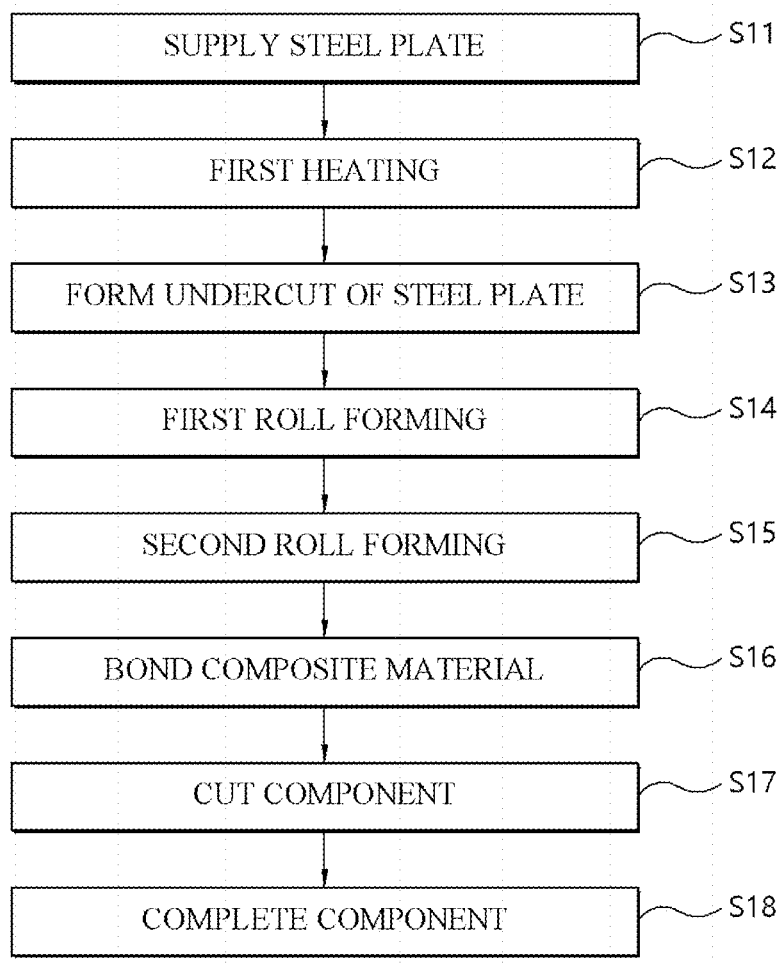
FIG. 3 illustrates a method for manufacturing the hybrid component according to the present disclosure.
Figure 4:
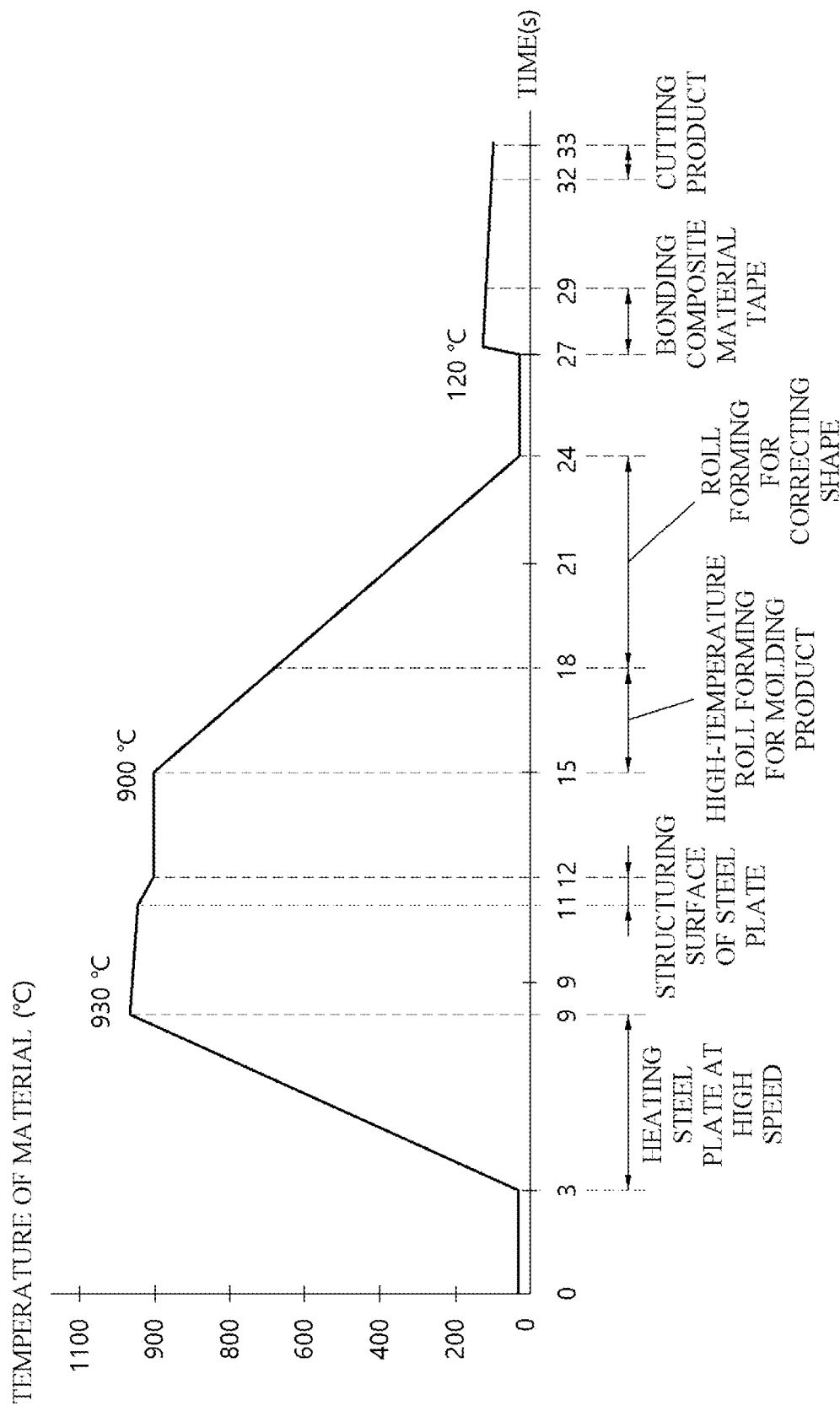
FIG. 4 illustrates a temperature condition in the method for manufacturing the hybrid component according to the present disclosure.

FIG. 2 illustrates a system for manufacturing a hybrid component according to the present disclosure, FIG. 3 illustrates a method for manufacturing the hybrid component according to the present disclosure, and FIG. 4 illustrates a temperature condition in the method for manufacturing the hybrid component according to the present disclosure.

Hereinafter, a method and a system for manufacturing a hybrid component according to an exemplary embodiment of the present disclosure will be described with reference to FIGS. 2 to 4 and the following drawings.

The present disclosure relates to a system and a method for manufacturing a hybrid component by bonding a composite material tape 12 to a steel plate 11 in order to secure the lightweight and rigidity of a finished product, such as a vehicle. The system for manufacturing the hybrid component according to the exemplary embodiment of the present disclosure includes a first thermal supplier 110 configured to heat the steel plate 11, a rolling roll for undercut 120 configured to form and pattern/structure an undercut on one surface of the steel plate 11, a first molding roll 141 configured to mold the steel plate 11 into a shape of a component to be manufactured, and a second molding roll 142 configured to additionally mold the molded steel plate 11 later. The system further includes a composite material pressurization roll 170 configured to bond the composite material tape 12 to one surface of the patterned steel plate 11, a second thermal supplier 180, and a steel plate cutter 190 configured to cut the steel plate 11 with the composite material tape 12 bonded to complete a hybrid component 20, and further includes a cartridge controller 132, a refrigerant gas circulator 150, and a composite material feeder 160.

As illustrated in FIG. 4, it takes about 33 seconds to manufacture one hybrid component 20, and a temperature and a time of the material by process are controlled in consideration of a molding condition, an operation time, and the like as illustrated in FIG. 4. Detailed configuration and operation method by process will be described in the order of the manufacturing method of FIG. 3.

(1) Uncoiling a Steel Plate Coil—Supplying the Steel Plate (S11)

Figure 5:
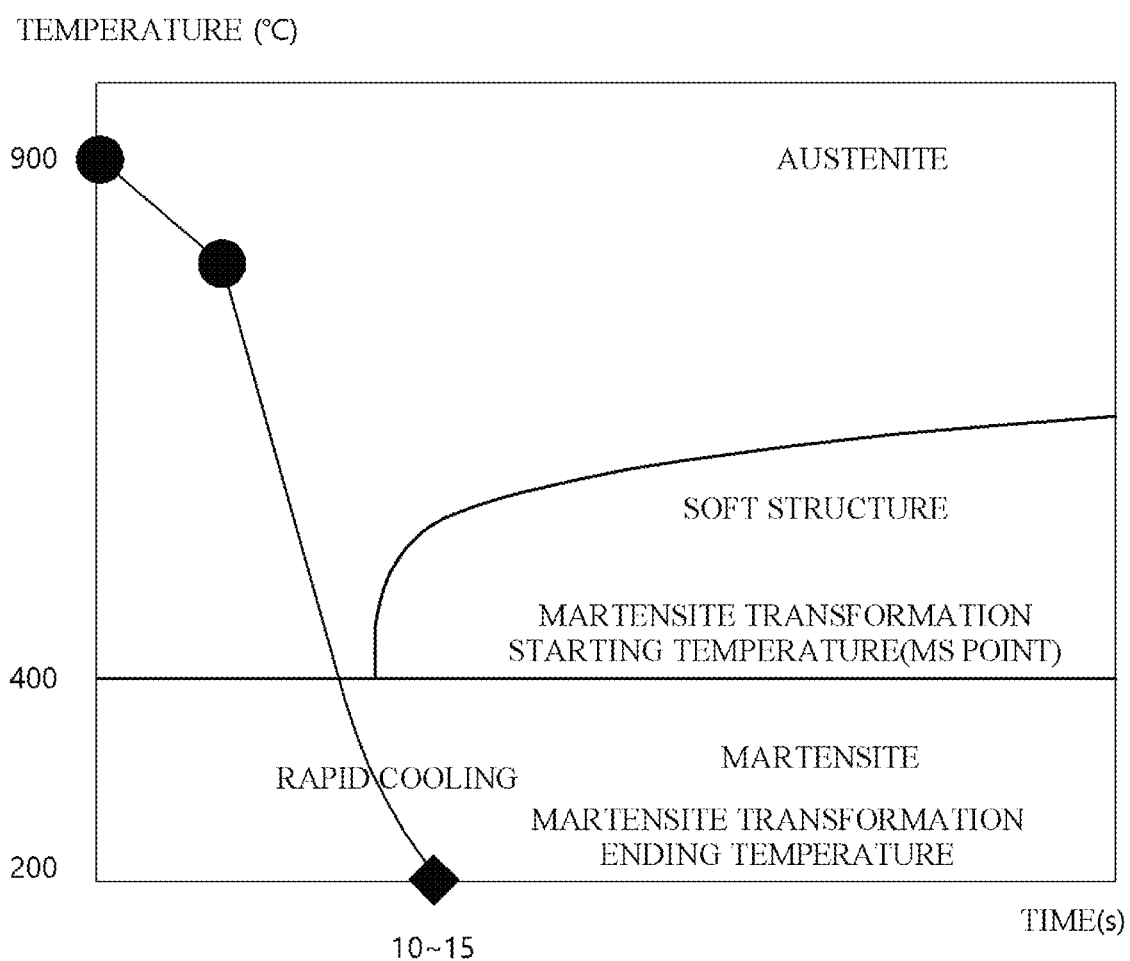
FIG. 5 illustrates a structure state of a steel plate upon high-speed heating.

The used steel plate 11 may apply a thermal treatment type boron steel plate with a tensile strength of 590 MPa class, in which for maximizing strength and workability in the finished hybrid component 20, the steel plate is transformed into a soft austenite structure at a high temperature of 900° C. or more to have improved moldability, and is transformed into a hard martensite structure when being rapidly cooled at a high temperature and a rate of −47° C./s or more as illustrated in FIG. 5, thereby securing a tensile strength of about 1470 MPa class. Further, to prevent an oxidized scale from being formed on the surface of the steel plate due to heating and cooling, an Al—Si plating material (coating layer) may be applied.

(2) Heating the Steel Plate at a High Speed—a First Heating Step (S12)

Figure 6:
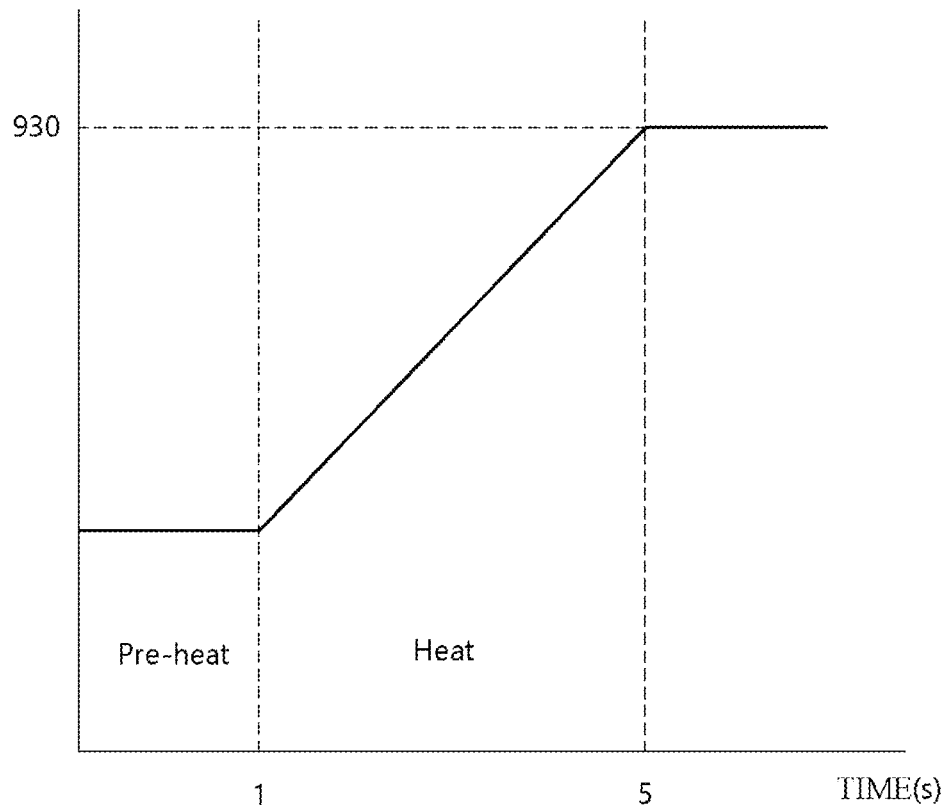
FIG. 6 illustrates a change in temperature upon high-speed heating of the steel plate.

This is a process of continuously heating the uncoiled steel plate 11 at a temperature or more at which the moldability of the steel plate 11 is maximized by the first thermal supplier 110 within 5 seconds as illustrated in FIG. 6 in consideration of the time by process in the continuous production of FIG. 4. In case of a general radiant furnace, the heating is not available within 5 seconds, and in case of an induction heating, the heating is available within 5 seconds but there occurs a phenomenon in which the Al—Si plating layer is concentrated to one side, and in case of the laser, it is difficult to heat a wide region and therefore, it is more preferable to use a xenon beam. The heating is preferably performed at 900° C. or more, and the heating is more preferably performed at about 930° C.±10° C. in consideration of a situation where the temperature is reduced by about 30° C./s by the natural cooling (−1° C./s) and the mold contact cooling (−20° C./s, the process of structuring the surface of the steel plate) such that the temperature of the material may be 900° C. in the process of molding the product as illustrated in FIG. 4.

(3) Structuring the Surface of the Steel Plate—Forming the Undercut on the Steel Plate (S13)

An original surface of the steel plate 11 has Ra 0.6 to 2.0 μm and a very low roughness and therefore, the composite material tape 12 may not be bonded thereto without a separate adhesive. To this end, one surface of the steel plate 11 heated by the first thermal supplier 110 is formed with the undercut by the rolling roll for undercut 120.

Figure 7:
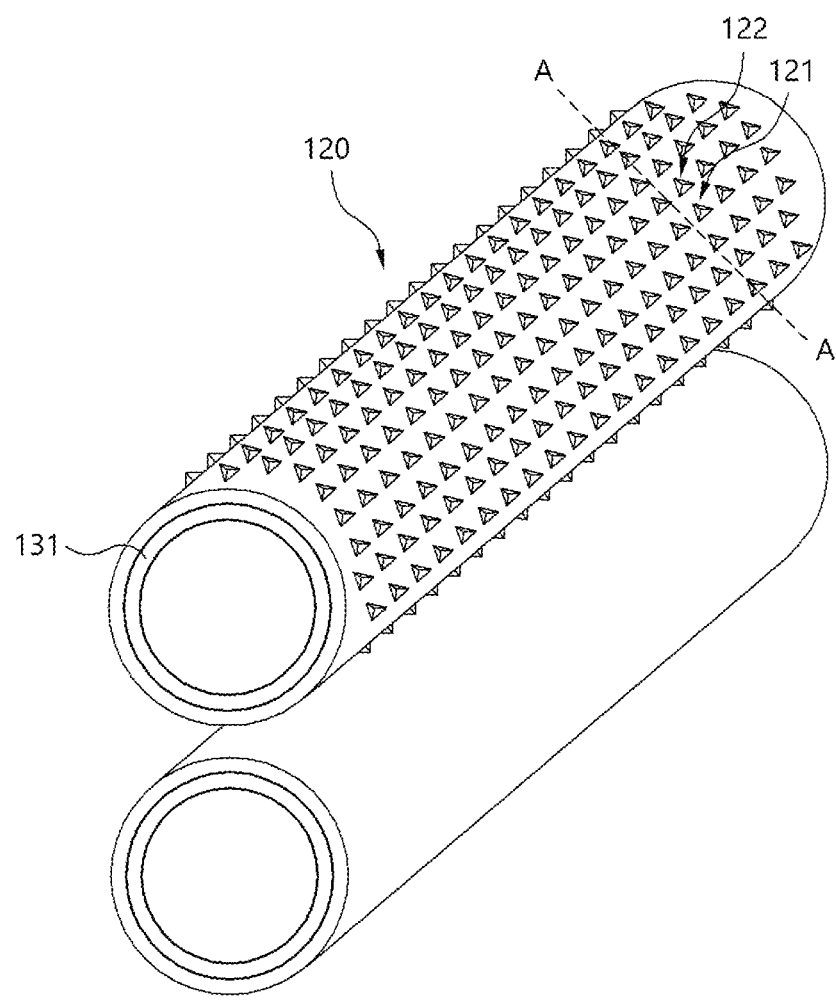
FIG. 7 illustrates a rolling roll for undercut among components of the system for manufacturing the hybrid component according to the present disclosure.
Figure 8:
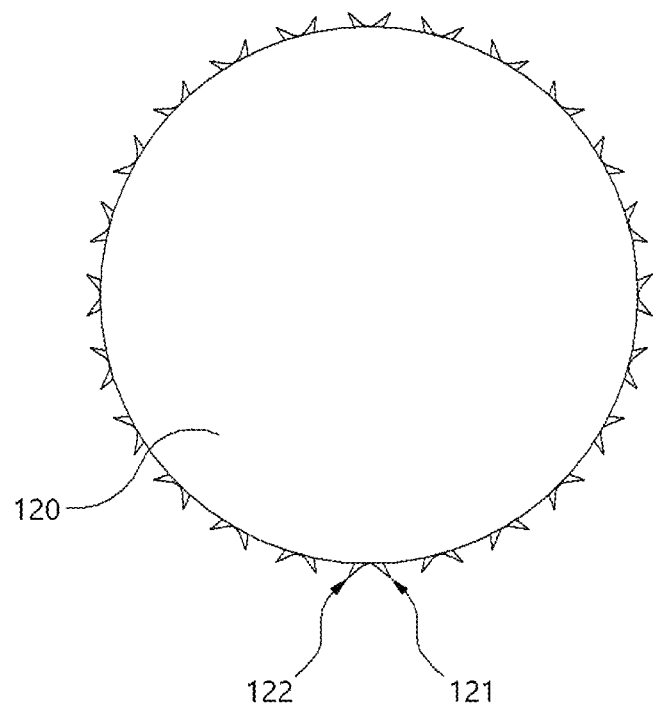
FIG. 8 illustrates a cross section taken along line A-A of FIG. 7.
Figure 9:
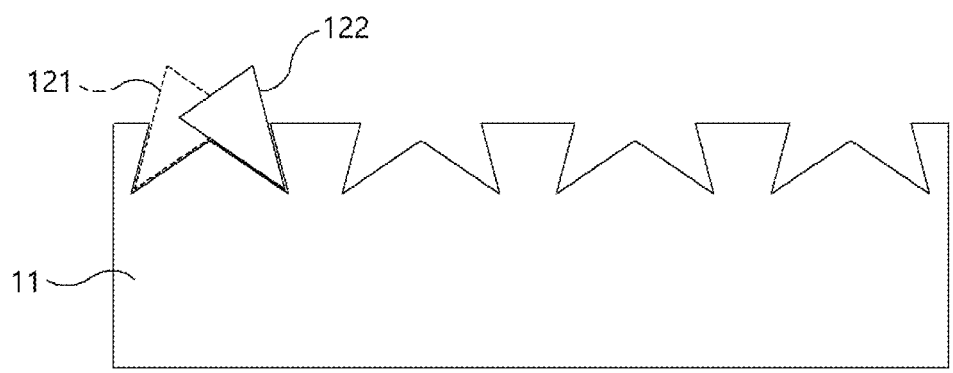
FIG. 9 illustrates a state where an undercut is formed by the rolling roll for undercut.
Figure 10:
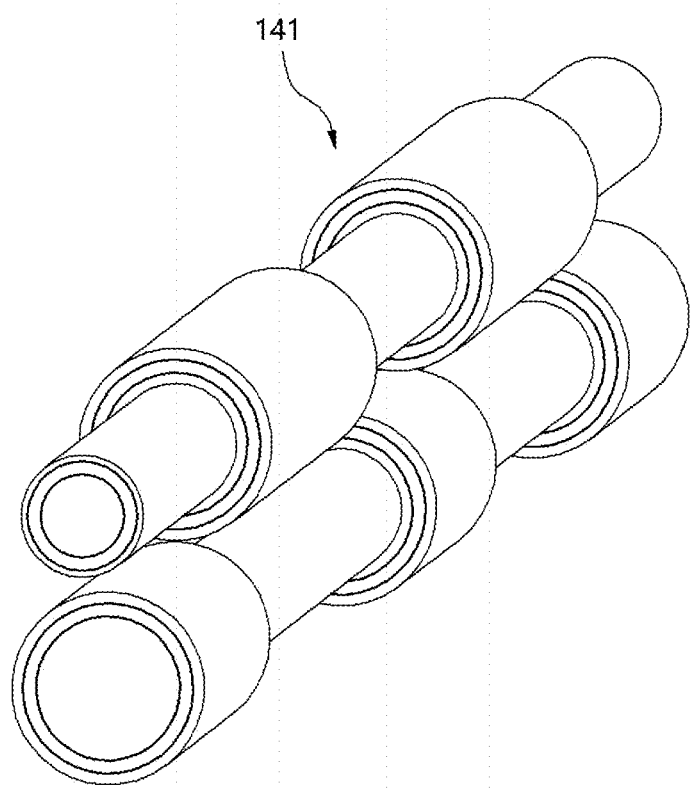
FIG. 10 illustrates a second molding roll among the components of the system for manufacturing the hybrid component according to the present disclosure.

In other words, if a separate structuring that forms an undercut 21 is performed for the surface of the steel plate 11 as illustrated in FIG. 9 by the rolling roll for undercut 120 having projections 121, 122 formed to protrude from an outer surface thereof as illustrated in FIGS. 7 and 8, the resin within the molten composite material tape 12 permeates into the shape of the undercut 21 at the time of patching the composite material tape 12 at the high temperature and then is solidified, thereby securing the bonding force.

A plurality of projections formed on the rolling roll for undercut 120 are formed on the entire outer surface of the rolling roll for undercut 120 to form the undercut 21 on the entire surface of the steel plate 11, and may have a shape with a pointy tip, such as a triangular pyramid, a cone, or a polygonal pyramid, and projections formed along the circumference of the circular cross section, such as the circular cross-sectional shape of the cylindrical rolling roll for undercut 120 illustrated in FIG. 8, may be arranged in a plurality of pairs by forming two projections in pair.

Further, any line connecting the bottom surface and edge end of the projection may be a direction that is tilted at a certain angle with respect to a radial direction as illustrated in FIG. 8.

Further, any lines connecting the respective bottom surfaces and edge ends of the pair of projections 121, 122 may not be parallel to each other.

Therefore, as illustrated in FIG. 9, the undercut is formed on an upper surface of the steel plate 11 by a first projection 121 first contacting the steel plate 11 of the pair of projections and then the undercut is sequentially formed on the upper surface of the steel plate 11 by a second projection 122.

If the shape of the undercut is provided at once, the projection on the roll surface may not be pulled out after pressing the surface, and therefore, as described above, the projection with the shape of the triangular pyramid is sequentially pressurized twice, that is, the first projection 121 forms the undercut and then is pulled out, and then the second projection 122 sequentially forms the undercut shape different from the undercut shape formed by the first projection 121.

As described above, the bonded surface area may be increased by providing a certain structuring to the surface of the steel plate 11, and the coupling force between the steel plate 11 and the composite material tape 12 may be increased by providing the mechanical interlocking through the shape of the undercut.

Further, to prevent the temperature of the additionally heated steel plate 11 from being rapidly reduced by the thermal conduction caused by contacting the rolling roll for undercut 120, a cartridge (cartridge heater) 131 is inserted into the rolling roll for undercut 120, and the cartridge controller 132 may control the temperature of the cartridge 131 to be maintained at 900° C.

(4) High-Temperature Roll Forming for Molding the Product—a First Roll Forming Step (S14)

The steel plate 11 is patterned by the rolling roll for undercut 120 and then a first molding roll 141 disposed vertically in a specific shape corresponding to a desired shape of the component as illustrated in FIG. 8 pressurizes the steel plate 11 to mold the steel plate 11 in the desired form.

A general room temperature roll forming may not mold the steel plate when the steel plate with a high strength is applied and therefore, gradually molds the steel plate using 20 or more rolls, but according to the present disclosure, one stage molding is available using the steel plate 12 that secures moldability due to the high-temperature heating in the first heating step at S12. Since it is possible to secure the tensile strength of 1470 MPa only when the additionally heated steel plate is rapidly cooled at the same time as molding, refrigerant (R) is circulated inside the rolling roll for undercut 120, and the refrigerant (R) is supplied and circulated by the refrigerant gas circulator 150.

As illustrated in FIG. 5, to transform the austenite with a soft structure into the hard martensite, the cooling is required up to 200° C. within 10 seconds. Therefore, the cooling may be made up to 200° C. or less within 9 seconds through the high-temperature roll forming process for molding the product and the roll forming process for correcting the shape as illustrated in FIG. 4 by keeping the temperature of the roll mold low using high-performance refrigerant, such as freon other than general coolant.

(5) Roll Forming for Correcting the Shape—a Second Roll Forming Step (S15)

Figure 12:
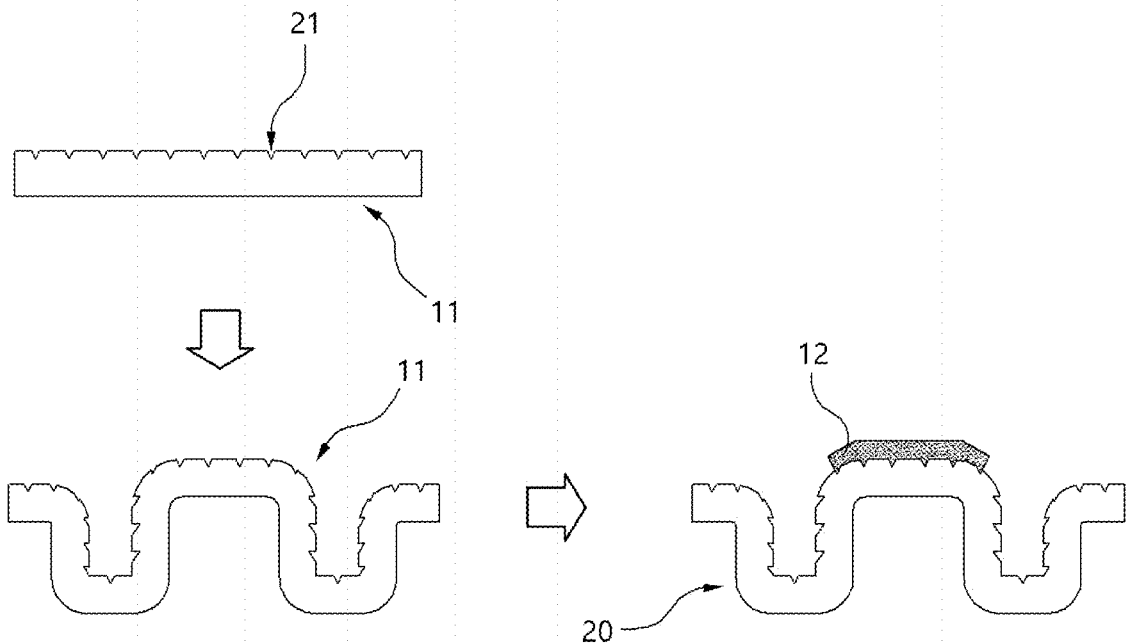
FIG. 12 illustrates a change in a manufacturing state by the components of FIGS. 10 and 11.

This is a process of correcting the shape additionally using about 4 or 5 second molding rolls 142 with the relatively small size because in the first roll forming step at S14 described above, the shape of the edge portion of the product or the like is not completely implemented through the molding by the first molding roll 141 with the large size, and the product is molded by the first roll forming step at S14 and the second roll forming step at S15 as illustrated in FIG. 12. It is preferable that the high-performance refrigerant (R), such as freon, is formed as a structure of flowing inside the second molding roll 142 in order to cool the product even in this process.

(6) Bonding the Composite Material Tape—Bonding the Composite Material (S16)

As described above, the steel plate 11 is molded, and then the composite material tape 12 is bonded to the surface of the steel plate 11, and to secure the bonding force upon patching, it is necessary to simultaneously heat two materials, that is, the steel plate 11 and the composite material tape 12.

The composite material tape 12 is, for example, made of 70% carbon fiber reinforcement plastics (CFRP) and 30% nylon and therefore, is heated at 120° C. or more such that the nylon impregnated into the CFRP may be melted, and the steel plate 11 is also heated at 120° C. or more because the molten nylon is cooled as soon as it contacts the steel plate if the temperature of the surface of the steel plate is low and therefore, does not permeate into the structuring structure of the undercut 21.

Figure 11:
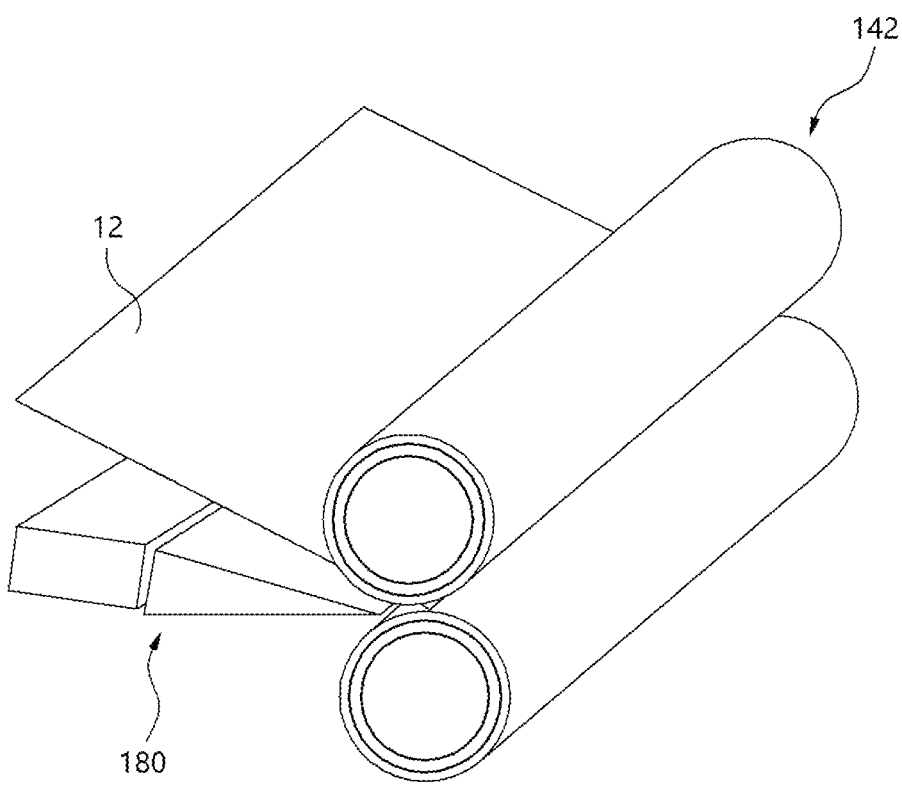
FIG. 11 illustrates a composite material feeder, a composite material pressurization roll, and a second thermal supplier among the components of the system for manufacturing the hybrid component according to the present disclosure.

As illustrated in FIGS. 11 and 12, the composite material feeder 160 is supplied such that the composite material tape 12 is seated on the steel plate 11 formed with the undercut 21, and the composite material pressurization roll 170 pressurizes the steel plate 11 and the composite material tape 12 from the top and the bottom.

Further, to simultaneously heat the steel plate 11 and the composite material tape 12, the second thermal supplier 180 simultaneously heats surfaces on which the steel plate 11 and the composite material tape 12 face each other, and to heat the steel plate 11 and the composite material tape 12 at a high speed, xenon with the highest absorption rate with respect to most materials because of the wide wavelength region of the light is used, and all of two materials are heated at the temperature of 120° C. or more.

At the same as heating, the composite material tape 12 is supplied to the surface of the steel plate 11 and pressurized by the composite material pressurization roll 170 and bonded to the surface of the steel plate 11. At this time, the molten nylon included in the composite material tape 12 permeates into the structuring of the undercut 21 on the surface of the steel plate 11 and is solidified, thereby securing the bonding force. At this time, the refrigerant (R) is circulated inside the composite material pressurization roll 170 and therefore, the heated composite material tape 12 and steel plate 11 may be cooled at a high speed.

(7) Cutting the Product—Cutting the Component (S17)

The product is completed by cutting the steel plate 11 molded by the aforementioned steps and having the composite material tape 12 patched thereon into the desired size of the product by the steel plate cutter 190 at S18. Further, the steel plate cutter 190 may be a laser cutter.

Figure 13:
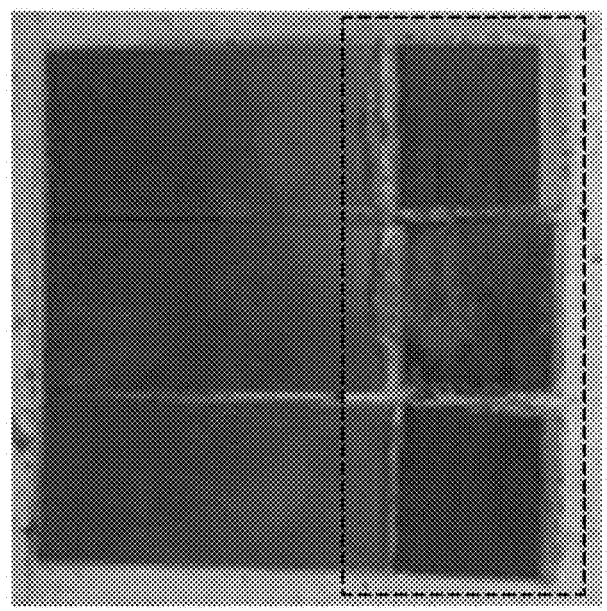
Figure 14:
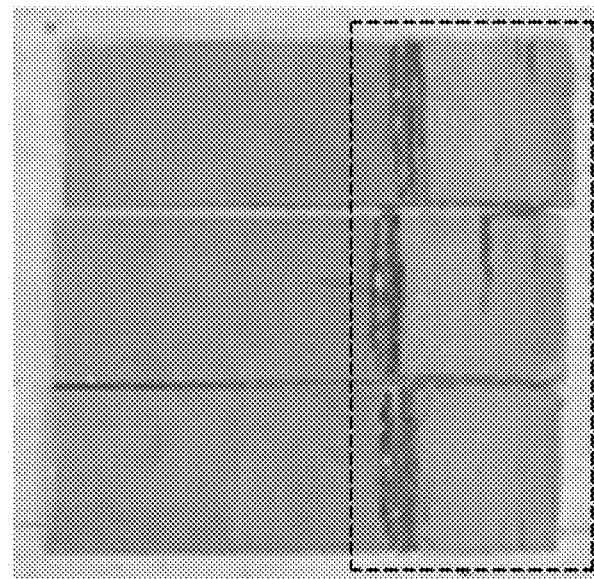

Next, FIGS. 13 and 14 illustrate the result of evaluating a bonding force between a steel plate and a composite material according to a structuring of a surface of the steel plate, in which FIG. 13 illustrates a case where the structuring is not performed, and FIG. 14 illustrates a state of a case where the structuring according to the present disclosure is performed.

In other words, the evaluation for the bonding force was conducted by a front end tensile test after bonding an opposite steel plate to the steel plate with the composite material tape patched and bonded using the structural adhesive, and a sample in which the structuring is not performed of FIG. 13 shows a state where the composite material tape is separated, and a sample in which the structuring is performed of FIG. 14 shows that the composite material tape is not separated and only the structural adhesive is broken.

As a result, it may be seen that it is possible to secure the bonding force between the steel plate and the composite material tape by the structuring according to the present disclosure.

Figure 15:
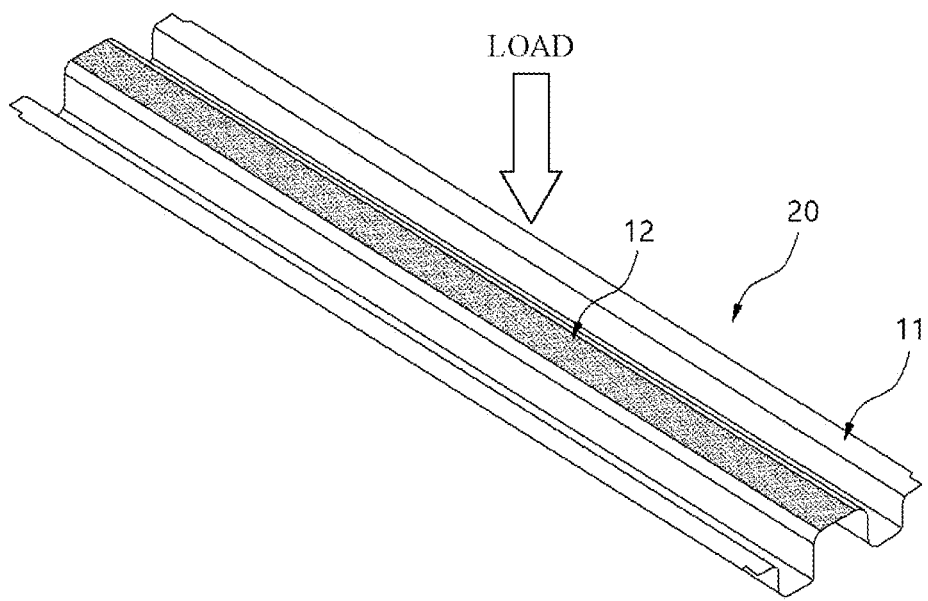
FIG. 15 illustrates a performance evaluation state of the hybrid component manufactured according to the present disclosure.
Figure 16:
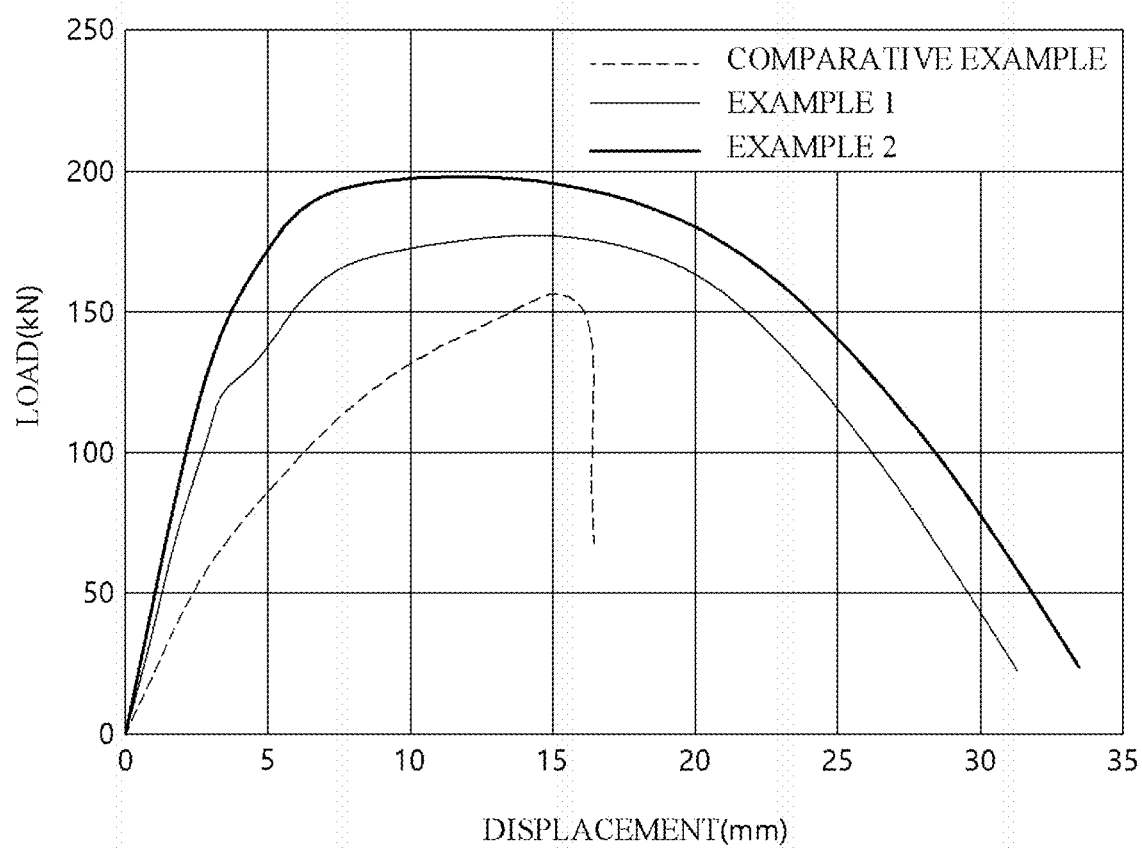
FIG. 16 illustrates the result thereof.

Next, the evaluation for a bending strength was conducted for the steel plate-composite material hybrid component produced by the process according to the present disclosure as illustrated in FIG. 15, and FIG. 16 illustrates the result thereof.

A Comparative Example illustrated is a product formed of solely the steel plate with the tensile strength of 1470 MPa class and the thickness of 1.0 t, Example 1 is a product in which the composite material tape is patched to the steel plate with the tensile strength of 1470 MPa class and the thickness of 0.8 t, and Example 2 is a product in which the composite material tape is patched to the steel plate with the tensile strength of 1470 MPa class and the thickness of 1.0 t.

As a result, if the composite material tape is patched according to the present disclosure, the bending strength is improved by 30% or more. Further, even when the thickness of the steel plate is reduced to 0.8 t, the bending strength is improved by 15% when the composite material tape is patched, and therefore, it may be seen that the weight may be reduced by 20% or more when the composite material tape is applied to the component.

As described above, the manufacturing system and manufacturing method according to the present disclosure may provide the certain pattern to the surface of the steel plate during the process, thereby increasing the bonded surface area, and improve the mechanical interlocking through the shape, thereby increasing the coupling force between the steel plate and the composite material within the short bonding time.

The present disclosure has been described above with reference to the exemplary drawings, but is not limited to the described exemplary embodiment, and it will be apparent to those skilled in the art that various modifications and changes are made without departing the spirit and scope of the present disclosure. Therefore, the modified examples or the changed examples are included in the claims of the present disclosure, and the scope of the present disclosure should be interpreted based on the appended claims.

The invention claimed is:

1. A system for manufacturing a hybrid component comprising:
   a first thermal supplier configured to heat a steel plate;
   a rolling roll for undercut configured to pressurize the steel plate heated by the first thermal supplier, and configured to form an undercut on one surface of the steel plate;
   a first molding roll configured to pressurize the steel plate formed with the undercut to mold the steel plate in a shape of a component to be manufactured;
   a composite material feeder configured to supply a composite material tape to be seated on one surface of the steel plate formed with the undercut through the first molding roll; and
   a composite material pressurization roll configured to pressurize the steel plate on which the composite material tape is seated.

2. The system for manufacturing the hybrid component of claim 1, wherein the first thermal supplier heats the steel plate at 900° C. or more.

3. The system for manufacturing the hybrid component of claim 2, wherein the first thermal supplier uses a xenon beam.

4. The system for manufacturing the hybrid component of claim 3, wherein the steel plate is coated with an Al—Si plating material.

5. The system for manufacturing the hybrid component of claim 2, further comprising a cartridge controller configured to control a temperature of a cartridge such that a temperature of the steel plate is maintained at 900° C. or more, the cartridge being disposed inside the rolling roll for undercut.

6. The system for manufacturing the hybrid component of claim 2, further comprising a refrigerant gas circulator configured to supply refrigerant, the refrigerant being circulated inside the first molding roll.

7. The system for manufacturing the hybrid component of claim 6, wherein the steel plate is cooled to 200° C. or less within 10 seconds after passing through the first molding roll.

8. The system for manufacturing the hybrid component of claim 7, further comprising a second thermal supplier configured to simultaneously heat the composite material tape supplied by the composite material feeder, and the facing surface of the steel plate.

9. The system for manufacturing the hybrid component of claim 8, wherein the second thermal supplier heats the steel plate and the composite material tape at 120° C. or more using a xenon beam.

10. The system for manufacturing the hybrid component of claim 2, wherein the rolling roll for undercut has a plurality of projections formed on an outer surface.

11. The system for manufacturing the hybrid component of claim 10, wherein any lines connecting bottom surfaces and edge ends of the plurality of projections are tilted with respect to a radial direction of the rolling roll for undercut.

12. The system for manufacturing the hybrid component of claim 11, wherein the plurality of projections formed along a circumference of any circular cross section of the rolling roll for undercut are arranged in a plurality of pairs by forming two projections in a pair.

13. The system for manufacturing the hybrid component of claim 12, wherein any lines connecting bottom surfaces and edge ends of the pair of projections are not parallel to each other.

* * * * *